(12) United States Patent
Ice

(10) Patent No.: US 6,884,097 B2
(45) Date of Patent: Apr. 26, 2005

(54) TRANSCEIVER LATCH MECHANISM

(75) Inventor: Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 6 days.

(21) Appl. No.: 10/685,913

(22) Filed: Oct. 15, 2003

(65) Prior Publication Data

US 2004/0077207 A1 Apr. 22, 2004

Related U.S. Application Data

(60) Provisional application No. 60/419,156, filed on Oct. 16, 2002.

(51) Int. Cl.[7] ............................................... H01R 13/62
(52) U.S. Cl. ........................ 439/160; 439/152; 439/923; 439/353; 361/728
(58) Field of Search .............................. 439/160, 155, 439/152, 352, 353, 357, 358, 377, 923; 361/728, 654

(56) References Cited

U.S. PATENT DOCUMENTS

| | | | |
|---|---|---|---|
| 4,083,619 A | | 4/1978 | McCormick et al. |
| 4,387,956 A | | 6/1983 | Cline |
| 4,414,605 A | * | 11/1983 | Chino et al. ................. 439/362 |
| 4,597,173 A | * | 7/1986 | Chino et al. ................. 439/160 |

(Continued)

FOREIGN PATENT DOCUMENTS

| | | |
|---|---|---|
| DE | 20005316 | 9/2000 |
| EP | 0456298 | 11/1991 |
| GB | 2297007 | 7/1996 |
| JP | 4165312 | 6/1992 |

OTHER PUBLICATIONS

US 6,554,622, 4/2003, Engel et al. (withdrawn)

Article Titled "Fiber Optic Module Interface Attachment", Oct. 1991, C. Baldwin, Published by Kenneth Mason Publication Ltd, England.

Article Titled "Field Replaceable Optical Link Card", Feb. 1994, IBM, pp. 47–49.

Article Titled "Small Form Factor Pluggable (SFP) Transceiver Multisource Agreement (MSA)", Agilent Technologies et al., Sep. 14, 2000, pp. 1–38.

Article Titled "CD Laser Optical Data Links for Workstations and Midrange Computers", Ronald L. Soderstrom et al., IBM Business Systems, 5pgs.

*Primary Examiner*—Tho D. Ta
(74) *Attorney, Agent, or Firm*—Workman Nydegger

(57) ABSTRACT

A latch mechanism for use with an electronic module, such as an opto-electronic transceiver module. The latch mechanism allows the user to selectively extract the transceiver module from the port by moving an attached bail between a first and second position. Specifically, the bail is connected to, and configured to translate, a pair of sliders that are configured and arranged to engage, and disengage from, corresponding structure of the port. When the bail is in the first position, the sliders releasably engage corresponding structure of the port. When the bail is moved from the first position to a second position, the sliders disengage from the corresponding structure of the port, thereby enabling unhindered extraction of the module from the port.

22 Claims, 16 Drawing Sheets

U.S. PATENT DOCUMENTS

| | | |
|---|---|---|
| 4,678,264 A | 7/1987 | Bowen et al. |
| 4,798,430 A | 1/1989 | Johnson et al. |
| 5,039,194 A | 8/1991 | Block et al. |
| 5,069,522 A | 12/1991 | Block et al. |
| 5,071,219 A | 12/1991 | Yurtin et al. |
| 5,195,897 A | 3/1993 | Kent et al. |
| 5,202,943 A | 4/1993 | Carden et al. |
| 5,256,080 A | 10/1993 | Bright |
| 5,329,428 A | 7/1994 | Block et al. |
| 5,416,871 A | 5/1995 | Takahashi et al. |
| 5,487,678 A | 1/1996 | Tsuji et al. |
| 5,528,408 A | 6/1996 | McGinley et al. |
| 5,546,281 A | 8/1996 | Poplawski et al. |
| 5,561,727 A | 10/1996 | Akita et al. |
| 5,596,665 A | 1/1997 | Kurashima et al. |
| 5,734,558 A | 3/1998 | Poplawski et al. |
| 5,738,538 A | 4/1998 | Bruch et al. |
| 5,767,999 A | 6/1998 | Kayner |
| 5,820,398 A | 10/1998 | Stabroth et al. |
| 5,879,173 A | 3/1999 | Poplawski et al. |
| 5,901,263 A | 5/1999 | Gaio et al. |
| 5,931,290 A | 8/1999 | Wehrli, III et al. |
| 5,947,435 A | 9/1999 | Small |
| 5,980,324 A | 11/1999 | Berg et al. |
| 6,050,658 A | 4/2000 | O'Sullivan et al. |
| 6,069,991 A | 5/2000 | Hibbs-Brenner et al. |
| 6,074,228 A | 6/2000 | Berg et al. |
| 6,081,431 A | 6/2000 | Lemke |
| 6,088,498 A | 7/2000 | Hibbs-Brenner et al. |
| 6,142,802 A | 11/2000 | Berg et al. |
| 6,142,828 A | 11/2000 | Pepe |
| 6,149,465 A | 11/2000 | Berg et al. |
| 6,169,295 B1 | 1/2001 | Koo |
| 6,229,708 B1 | 5/2001 | Corbin, Jr. et al. |
| 6,231,145 B1 | 5/2001 | Liu |
| 6,259,769 B1 | 7/2001 | Page et al. |
| 6,430,053 B1 * | 8/2002 | Peterson et al. ............ 361/728 |
| 6,434,015 B1 | 8/2002 | Hwang |
| 6,439,918 B1 | 8/2002 | Togami et al. |
| 6,494,623 B1 | 12/2002 | Ahrens et al. |
| 6,517,382 B2 | 2/2003 | Flickinger et al. |
| 6,524,134 B2 | 2/2003 | Flickinger et al. |
| 6,532,155 B2 | 3/2003 | Green et al. |
| 6,533,603 B1 | 3/2003 | Togami |
| 6,538,882 B2 | 3/2003 | Branch et al. |
| 6,544,055 B1 | 4/2003 | Branch et al. |
| 6,556,445 B2 | 4/2003 | Medina |
| 6,570,768 B2 | 5/2003 | Medina |
| 2002/0142649 A1 | 10/2002 | Baugh et al. |
| 2003/0020986 A1 | 1/2003 | Pang et al. |
| 2003/0044129 A1 | 3/2003 | Ahrens et al. |
| 2003/0059167 A1 | 3/2003 | Chiu et al. |
| 2003/0100204 A1 | 5/2003 | Hwang |

* cited by examiner

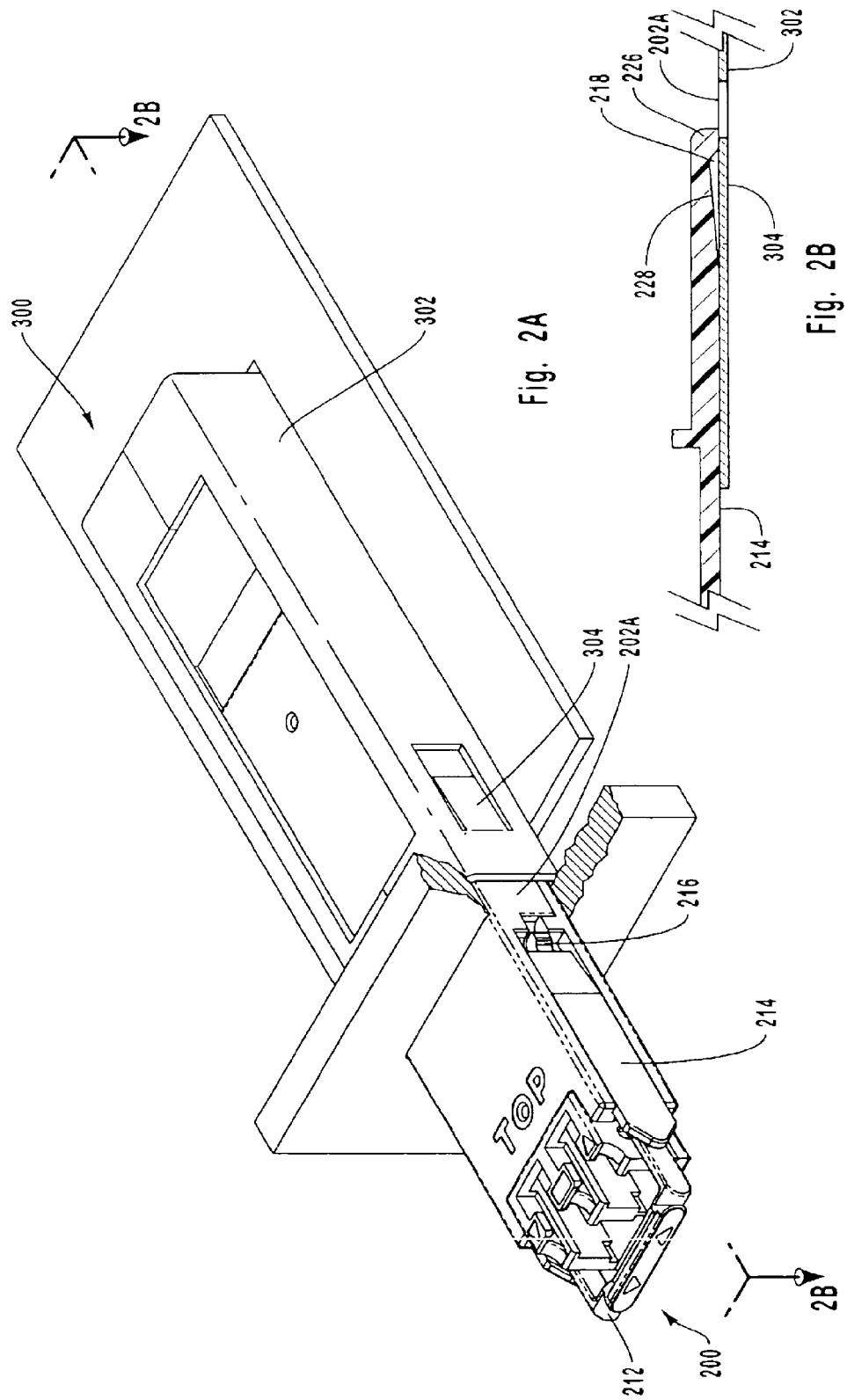

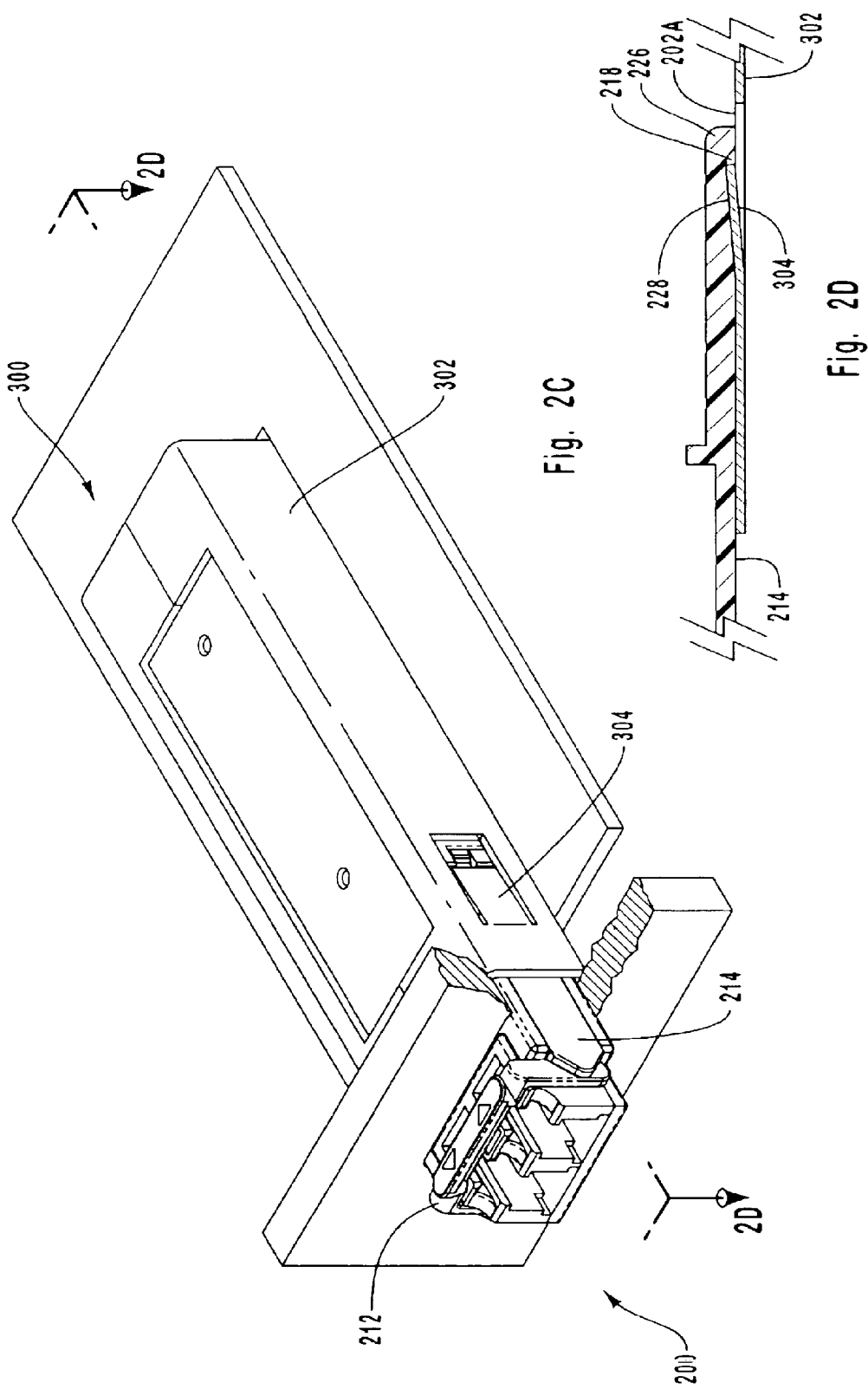

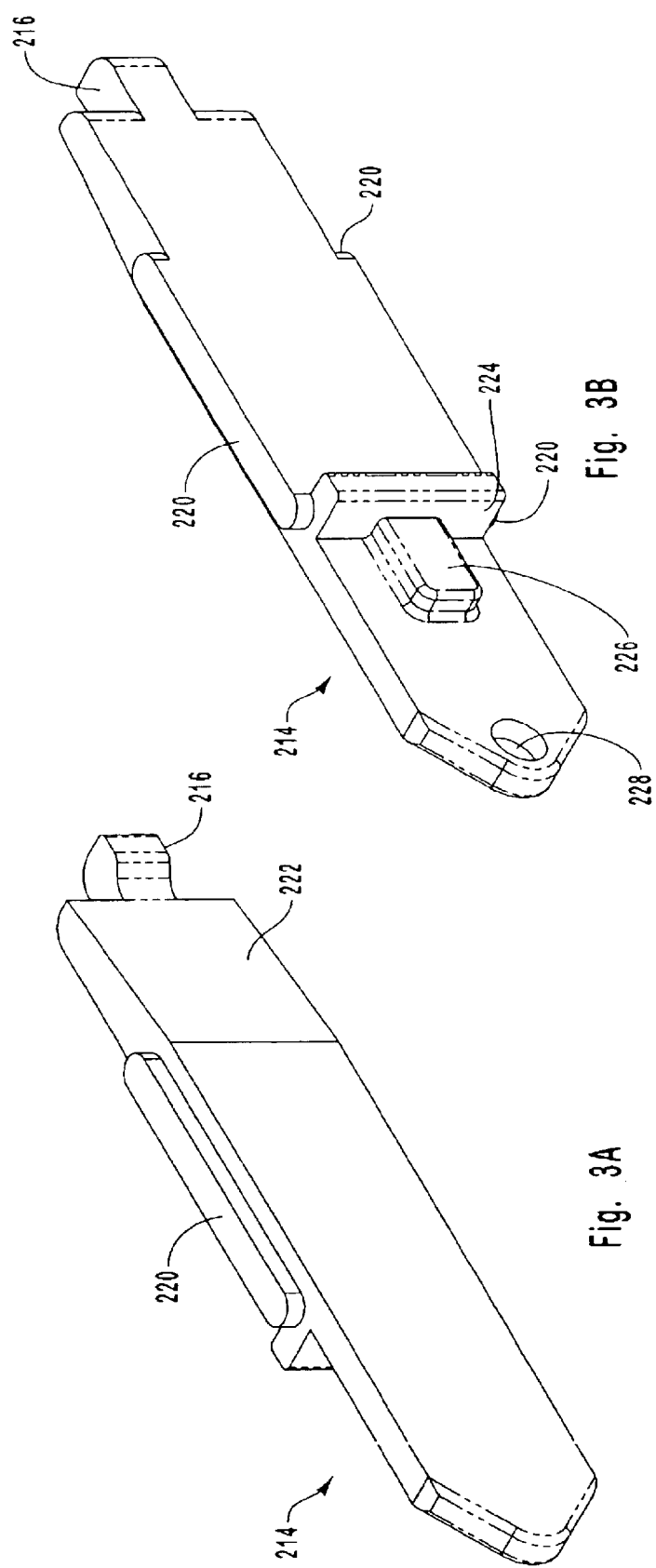

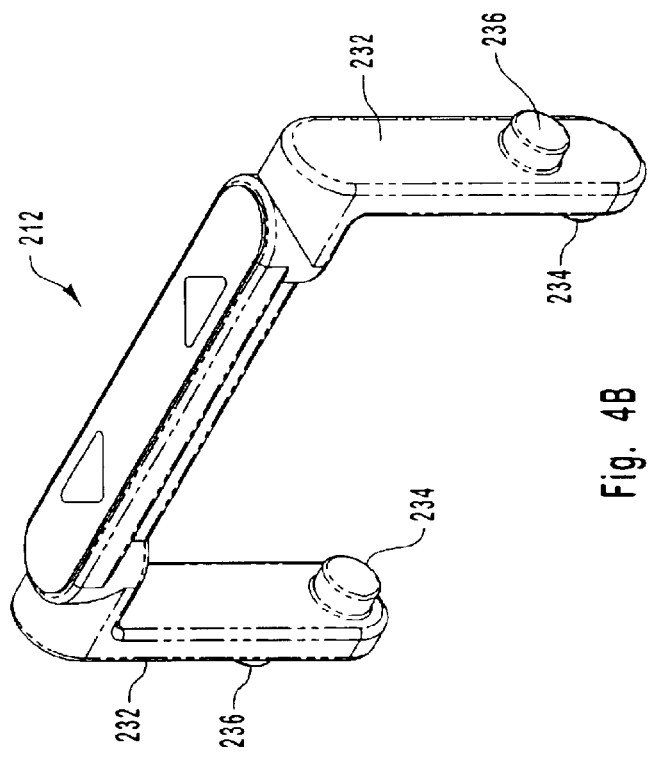
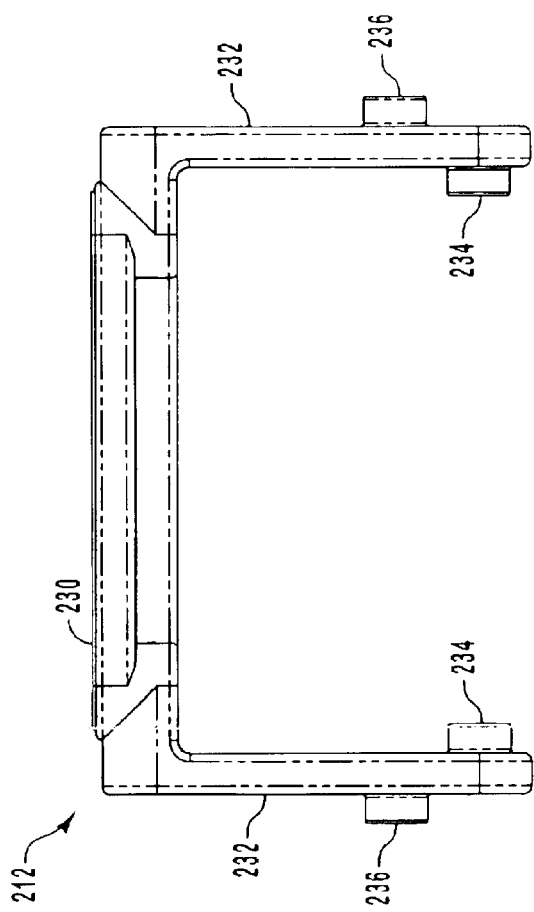

TRANSCEIVER LATCH MECHANISM

CROSS-REFERENCE TO RELATED APPLICATIONS

This application claims the benefit of U.S. Provisional Patent Application Ser. No. 60/419,156, entitled XFP TRANSCEIVER BAIL, filed on Oct. 16, 2002 and incorporated herein in its entirety by this reference.

BACKGROUND OF THE INVENTION

1. Field of the Invention

The present invention relates generally to the field of connector systems for optical and electrical components. In particular, embodiments of the present invention relate to a latching system that is useful in connection with small form factor, user-removable, electronic modules that interface with a port of a host device.

2. Related Technology

Fiber optic transmission media are increasingly used for transmitting optical, voice, and data signals. As a transmission vehicle, light provides a number of advantages over traditional electrical communication techniques. For example, optical signals enable extremely high transmission rates and very high bandwidth capabilities. Also, optical signals are unaffected by electromagnetic radiation that causes electromagnetic interference ("EMI") in electrical signals. Optical signals also provide a more secure signal because the optical transmission medium, such as an optical fiber, does not allow portions of the signal to escape, or be tapped, from the optical fiber, as can occur with electrical signals in wire-based transmission systems. Optical signals can also be transmitted over relatively greater distances without experiencing the signal loss typically associated with transmission of electrical signals over such distances.

While optical communications provide a number of advantages, the use of light as a data transmission vehicle presents a number of implementation challenges. For example, prior to being received and/or processed, the data represented by the optical signal must be converted to an electrical form. Similarly, the data signal must be converted from an electronic form to an optical form prior to transmission onto the optical network.

Typically, these conversion processes are implemented by way of optical transceiver modules located at either end of an optical fiber. Each optical transceiver module typically contains a laser transmitter circuit capable of converting electrical signals to optical signals, and an optical receiver capable of converting received optical signals into electrical signals.

Typically, an optical transceiver module is electrically interfaced with a host device, such as a host computer, switching hub, network router, switch box, or computer I/O, via a compatible connection port. In some applications, it is desirable to miniaturize the optical transceiver module as much as possible to increase the port density. Generally, port density refers to the number of network connections within a given physical space, so that a relative increase in the number of such network connections within the defined physical space corresponds to a relative increase in port density.

Because the optical transceiver modules occupy a significant amount of space on the host device, reducing the physical space needed for each optical transceiver module allows for a relatively higher port density. In addition, it is desirable in many applications for the module to be "hot-pluggable," which means that the optical transceiver module may be inserted and removed from the host system without securing the electrical power to the module or host. In an attempt to accomplish many of these objectives, international and industry standards have been adopted that control the physical size and shape of optical transceiver modules. Among other things, such standards help to insure compatibility between systems and components produced by different manufacturers.

One example of such an optical transceiver module is the z-axis hot pluggable module of the 10-Gigabit Small Form-factor Pluggable (XFP) Module Group, a module Multi Source Agreement (XFP-MSA) association. The XFP-MSA is an association of companies that has developed a specification for a 10 gigabit per second ("Gbps") transceiver module having compatible mechanical and electrical features. The aforementioned type of optical transceiver module is sometimes referred to as an "XFP transceiver module" or simply an "XFP" module.

The XFP optical transceiver module is designed to slide into a port of a host device. On one end of the port is a so-called "right angle" surface-mount connector that fits through a bottom rear end opening of the port. The surface-mount connector is also connected to the host board. The rear end of the transceiver module includes a printed circuit board having a card-edge connector. This card edge connector mechanically and electrically interfaces with the host signal interface, which includes the aforementioned surface mount connector as well as associated high-speed interconnects.

A pluggable optical transceiver module, such as an XFP module, must be capable of being latched and unlatched to the port of the host device. If the optical transceiver module is not securely and reliably latched to the port, the card-edge connector of the optical transceiver module may disengage and disrupt transmission or reception of the data signal. The optical transceiver module should also be capable of being unlatched and removed in the event that the module requires, repair, testing or replacement.

The latch mechanism must also permit removal of the module while fitting within the dimensions defined by the MSA specifications. At least some transceiver standards specify a latching pin disposed on the transceiver module that serves to latch the module in the port. The latching pin is movably coupled to a bail such that the latching pin can be extended into a hole in the port to latch the module into place. However, such conventional latch mechanisms are not compatible with the XFP MSA specifications.

Therefore, there is a need for a module, such as an optical transceiver module, having a latch mechanism that locks the module to the XFP port and complies with MSA specifications. An exemplary latch mechanism should provide secure and reliable latch and unlatch functionality, provide a handle for extraction of the module from the host port, and be consistent with MSA or other applicable specifications.

BRIEF SUMMARY OF AN EXEMPLARY EMBODIMENT OF THE INVENTION

The foregoing, and other, problems in the prior art are addressed by embodiments of the present invention, which generally relate to a latch mechanism suitable for use in connection with an electronic, pluggable module. In one exemplary embodiment, the module is an opto-electronic transceiver module, typically used to interface an optical transmission cable to a host device, such as a network switch, hub, router, computer or the like. However, embodiments of the invention may be usefully employed in other environments as well.

In one exemplary embodiment, the module, wherein the latch mechanism is employed, comprises an XFP transceiver module in conformance with industry standards. The module is capable of being operatively received within a compatible port of a host device.

In this exemplary embodiment, the module includes a housing, which is divided into an upper housing and bottom cover. The housing supports a printed circuit board ("PCB") upon which are disposed the electronics needed to implement the functionality of the module. The PCB has an edge connector formed at one end that is capable of electrically interfacing with the port of the host device when the module is operatively received within the device port. Also disposed on one end of the base portion of the module is at least one receptacle capable of physically receiving and interfacing with a corresponding optical fiber connector, which in turn is connected to a fiber optic cable. In this embodiment, the housing encloses at least a portion of the base and protects the electronic and optical components from dust and the like. Moreover, the housing defines an outer periphery that conforms in size and shape to a corresponding MSA standard host port.

Generally, the latch mechanism of the module enables the releasable securement of the transceiver module within the host port. Exemplarily, the latch mechanism is implemented within a transceiver module that conforms to the MSA standards for an XFP transceiver module and comprises a pair of sliders disposed within recesses defined by sidewalls of the module. The sliders are arranged for simultaneous linear motion by virtue of attachment to a bail of the latch mechanism. The bail is configured and arranged for rotational motion. The sliders cooperate with the module sidewalls to define opposing recesses configured to removably receive corresponding structure of the port wherein the module is to be inserted.

In operation, the module interacts with the port of the host when the module is operably received in the port. Specifically, the module is locked into the port when the module engages corresponding structure of the port. Release of the module from the port is effected by way of a moveable bail coupled to a slider through a cam. The bail is moveable between two positions that correspond, respectively, to positions where the module is latched to the port and where the module is unlatched from the port. That is, motion of the bail from the first position to the second position translates the slider between a first position where the slider enables the module to releasably engage the port (the latched position), and a second position where the slider causes the module to be disengaged from the port (the unlatched position).

As noted above, the module releasably engages corresponding structure of the port, such as a resilient tab that is biased into an engaging position. In this exemplary implementation, a recess cooperatively defined by the slider and module sidewall releasably receives the biased resilient tab of the port, thereby securing the module to the port. The module is released by moving the bail to a second position, which translates the slider so that as the slider moves, a ramp on the foot of the slider engages the resilient tab, flexing the resilient tab out of the recess defined by the slider and module sidewall and thus enabling retraction of the module from the port.

Among other things then, the latch mechanism permits easy insertion and extraction of the module by a user. In addition, extraction of the module can be accomplished without the use of a specialized extraction tool, and without disturbing adjacent modules and/or cables.

These and other aspects of embodiments of the invention will become more fully apparent from the following description and appended claims.

BRIEF DESCRIPTION OF THE DRAWINGS

In order that the manner in which the above-recited and other aspects of the invention are obtained, a more particular description of the invention briefly described above will be rendered by reference to specific embodiments thereof which are illustrated in the appended drawings. Understanding that these drawings depict only exemplary embodiments of the invention and are not therefore to be considered limiting of its scope, the invention will be described and explained with additional specificity and detail through the use of the accompanying drawings in which:

FIG. 2A is a perspective view illustrating an exemplary module that is unlatched from the port of an exemplary host device;

FIG. 2B is a section view taken from FIG. 2A and illustrating further details of the arrangement of the module with respect to the port when the module is unlatched from the port of a host device;

FIG. 2C is perspective view illustrating aspects of the arrangement of a module with respect to a port of a host device when the module is fully received within the port of a host device;

FIG. 2D is a section view taken from FIG. 2C and illustrating further details of an exemplary arrangement of a module and associated latch mechanism with respect to the port when the module is latched to the port of the host device;

FIG. 3A is a perspective view illustrating aspects of an exemplary slider such as may be employed in connection with the latch mechanism of FIG. 2A;

FIG. 3B is a perspective view illustrating further aspects of an exemplary slider such as may be employed in connection with the latch mechanism of FIG. 2A;

FIG. 4A is a front view of an implementation of a bail of the latch mechanism;

FIG. 4B is a perspective view of the bail depicted in FIG. 4A;

DETAILED DESCRIPTION OF EXEMPLARY EMBODIMENTS

In general, exemplary embodiments of the present invention relate to a latch mechanism suitable for use in an electronic module, such as an opto-electronic transceiver for example, to releasably secure the electronic module within a host slot or port assembly. Moreover, the latch mechanism can be implemented within transceiver modules that conform to industry standards. The latch mechanism permits easy extraction and insertion of the module by a user, even when the module is used in a host system having a higher-density port configuration than permitted by the MSA, such as when the modules are disposed in ports immediately nearly adjacent to one another in one or both lateral dimensions.

Thus, while exemplary embodiments of the invention are implemented in an MSA-compliant form, such embodiments may nonetheless be readily employed in connection with non-MSA compliant systems and devices, examples of which include those systems and devices that include, or require, non-MSA compliant high-density port configurations. Another aspect of exemplary embodiments of the invention is that extraction of the module can be accomplished without the use of a specialized extraction tool, and can be performed without disturbing adjacent modules and cables.

While embodiments of the present invention are described in the context of optical transceiver modules used in the field of optical networking, it will be appreciated that embodiments of the invention may be employed in other operating environments where the functionality disclosed herein may be useful. Accordingly, the scope of the invention should not be construed to be limited to the exemplary implementations and operating environments disclosed herein.

I. Exemplary Structural Aspects of an Implementation of the Invention

Figure 1:
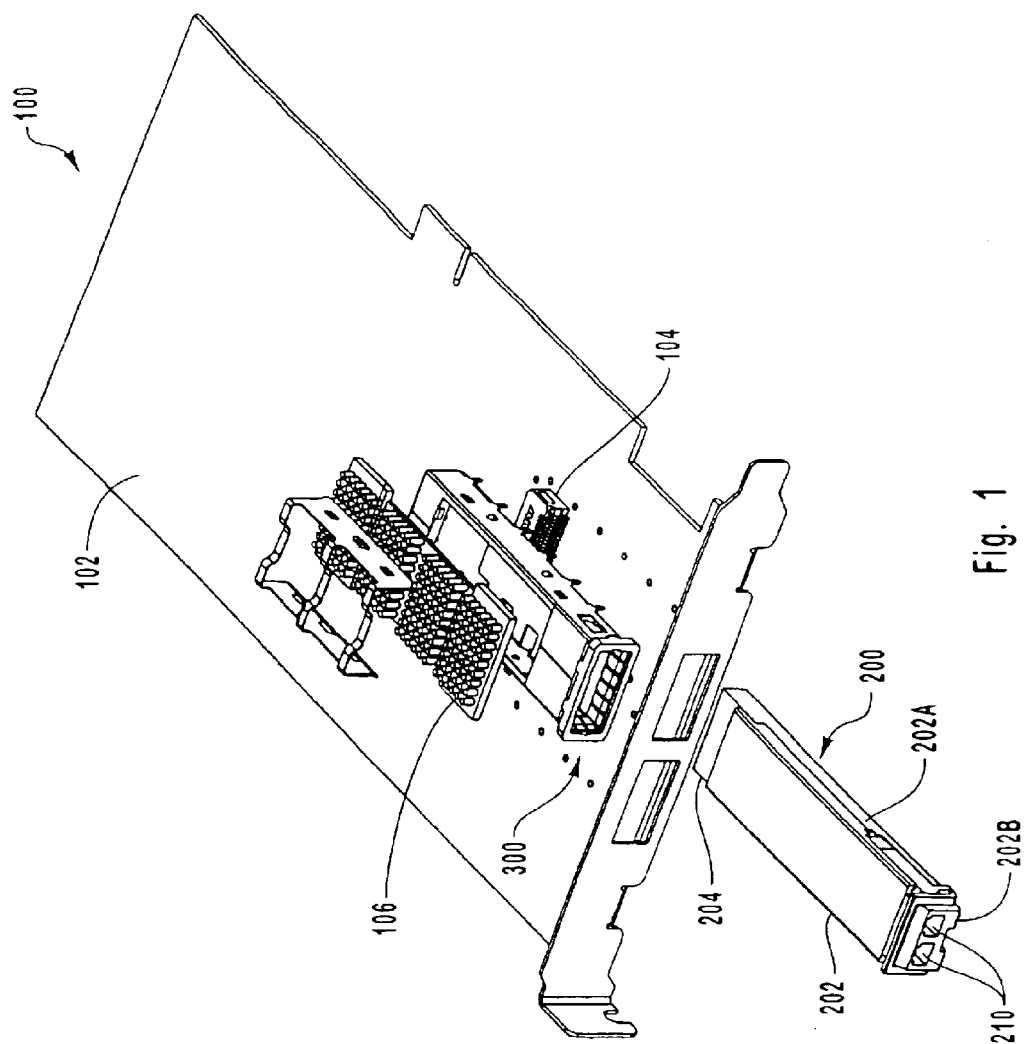
FIG. 1 is an exploded perspective view of an exemplary implementation of a module and associated latch mechanism as employed in an exemplary operating environment.

Reference is first made to FIG. 1, which illustrates a partially exploded view of a host device 100 that includes a printed circuit board 102, a host interface 104, and a heat sink 106. The host device 100 is configured to receive, and operably interact with, a module 200, such as an optical transceiver module for example, by way of a port 300 disposed on the printed circuit board 102. The heat sink 106 is positioned over the port 300 so as to dissipate heat generated by operation of the module 200.

Figure 5:
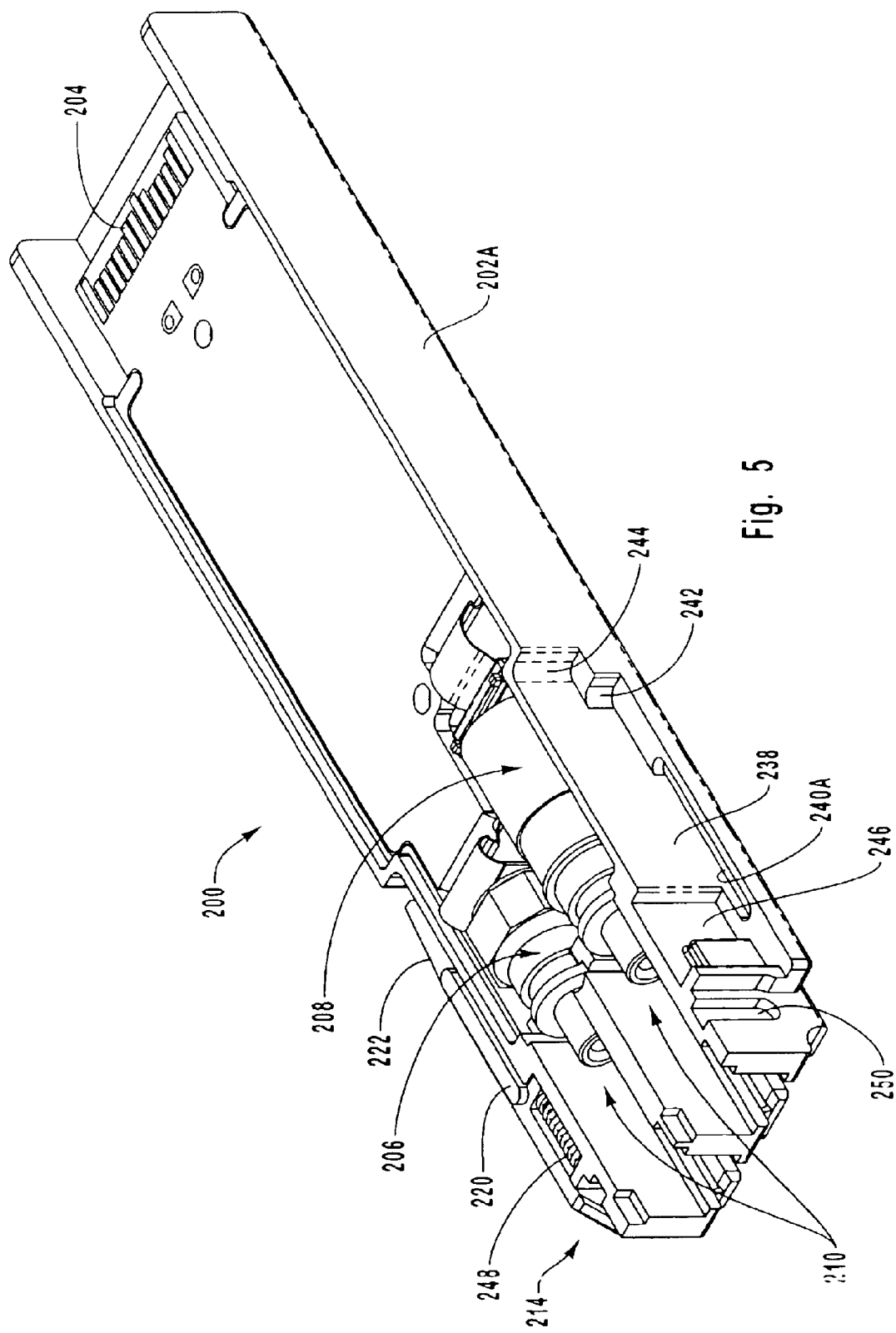
FIG. 5 is a perspective view of the bottom of the module of FIG. 2A, with certain parts of the module removed for clarity, indicating aspects of the structure of the module that pertain to the latch mechanism.

When embodied as an optical transceiver, the module 200 generally operates to transmit and receive optical signals over transmission media such as fiber optic cables. To that end, some exemplary implementations of module 200, aspects of which are indicated in FIG. 5 discussed below, include, in addition to a module housing 202 having module sidewalls 202A, bottom cover 202B, and edge connector 204, various components configured and arranged to transmit and receive optical signals, including a receive optical subassembly ("ROSA") 206, and a transmit optical subassembly ("TOSA") 208. The various internal components are housed with the module housing 202.

Generally, the edge connector 204 serves to enable communication between the module 200 and the host device 100 by electrically interfacing with port 300. More particularly, the module 200 receives, from port 300, the electrical data signal that is to be transmitted as an optical signal. Likewise, the module 200 sends data to the host device 100, by way of port 300, that the module 200 has received in optical form and converted to electrical form. In addition to the aforementioned components, exemplary implementations of module 200 typically include a pair of optical cable ports 210 (FIG. 5) where a pair of fiber optic cables can be optically coupled.

It should be understood that while many of the figures herein illustrate only one side, or a portion of, components such as the module 200, the configuration of the module is generally symmetric so that the configuration and arrangement of the module and latch mechanism on one side of the module substantially mirrors the configuration and arrangement of the module and latch mechanism on the other side of the module. Thus, while reference may be made herein to one side of the module and/or latch mechanism, such discussion is equally germane to the other, non-illustrated, side of the module and latch mechanism.

Directing attention now to FIGS. 2A and 2B, further details are provided concerning the arrangement of the module 200, with respect to the port 300 of the host device 100, when the module 200 is partially received in the port 300. Exemplarily, the port 300 includes two resilient tabs 304 that are biased inward from the sidewalls 302 of port 300. As indicated in the Figures, the module 200 includes a bail 212, as well as a pair of sliders 214 that are disposed on opposite sides of the module 200 and each of which includes a respective ramp 216 configured and arranged to interact with a corresponding resilient tab 304 of the port 300.

As suggested in the Figures, the position of the bail 212 generally corresponds to a particular disposition of the sliders 214 and corresponding ramps 216. More particularly, the exemplary illustrated embodiment of the module 200 is configured such that a substantially horizontal bail 212 position corresponds to an unlatched arrangement of the module 200 relative to the port 300. In general, motion of the bail 212 causes operative motion of the sliders 214, so as to effect removal and insertion of the module 200 with respect to the port 300, as discussed in further detail below.

Details concerning the situation where the module 200 is removably latched to the port 300 are provided in FIGS. 2C and 2D. As indicated in the Figures, each slider 214 of the module 200 generally cooperates with a corresponding sidewall 202A of the module housing 202 to define a recess 218 configured and arranged to enable latching of the module 200 to the port 300 by removably receiving the resilient tab 304 of the port 300, as best illustrated in FIG. 2D. More particularly, the latched arrangement indicated in FIGS. 2C and 2D is achieved when the resilient tab 304, biased inward toward the module 200, is removably received within the recess 218. The end wall 242 of the recess 218 is substantially perpendicular to the resilient tab 303 creating a barrier that prevents the module from being withdrawn from the port 300.

Any other structural arrangement that is effective in providing functionality comparable to that implemented by the recess 218 and resilient tab 304 may alternatively be employed. Accordingly, the scope of the invention should not be construed to be limited to the disclosed exemplary implementations.

With attention now to FIGS. 3A and 3B, further details are provided concerning an exemplary implementation of the slider 214 in connection with which the module 200 is latched to, and unlatched from, the port 300. As generally indicated in FIGS. 3A and 3B, the illustrated exemplary embodiment of the slider 214 is symmetrical about a longitudinal axis. As a result of this configuration, the same slider 214 design can be used to manufacture sliders for both sides of the module 200, thereby reducing manufacturing cost. The slider 214, as well as the bail 212, may be constructed of any suitable material(s) or combinations thereof including, but not limited to, plastic and metal.

With particular reference first to FIG. 3A, a perspective view of a first side of the slider 214, arranged to face outward from the module 200 toward the sidewall 302 of the port 300, is indicated. The slider 214 includes upper and lower guide portions 220 configured and arranged to cooperate with corresponding structure of the module sidewall 202A, discussed below, to define a range of sliding linear motion for the slider 214. In addition, the slider 214 includes an incline portion 222 that terminates in the ramp 216.

Figure 7A:
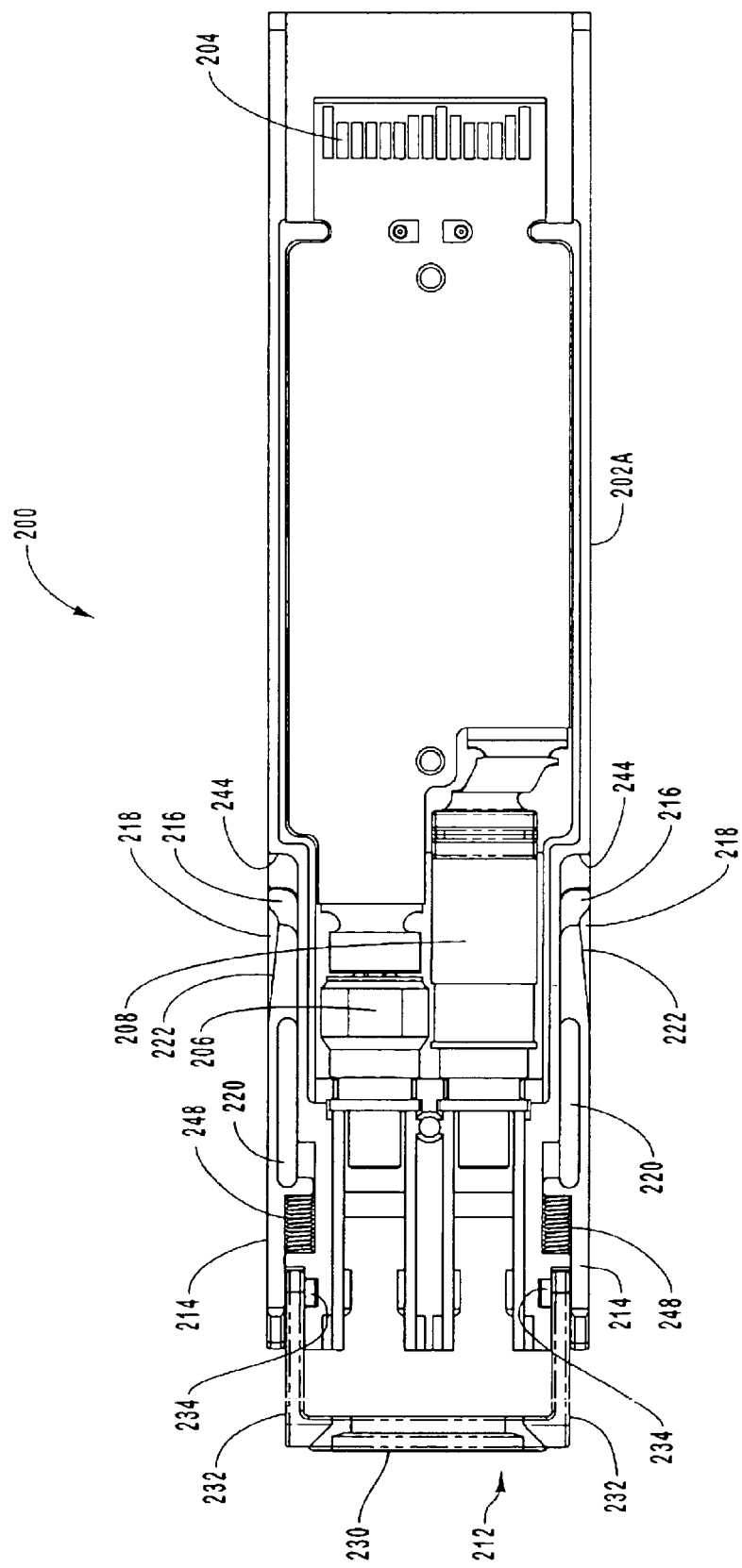
FIG. 7A is a bottom view of an exemplary module with the bottom cover removed and illustrates aspects of the arrangement and effect of resilient elements employed as part of an exemplary latch mechanism.
Figure 7B:
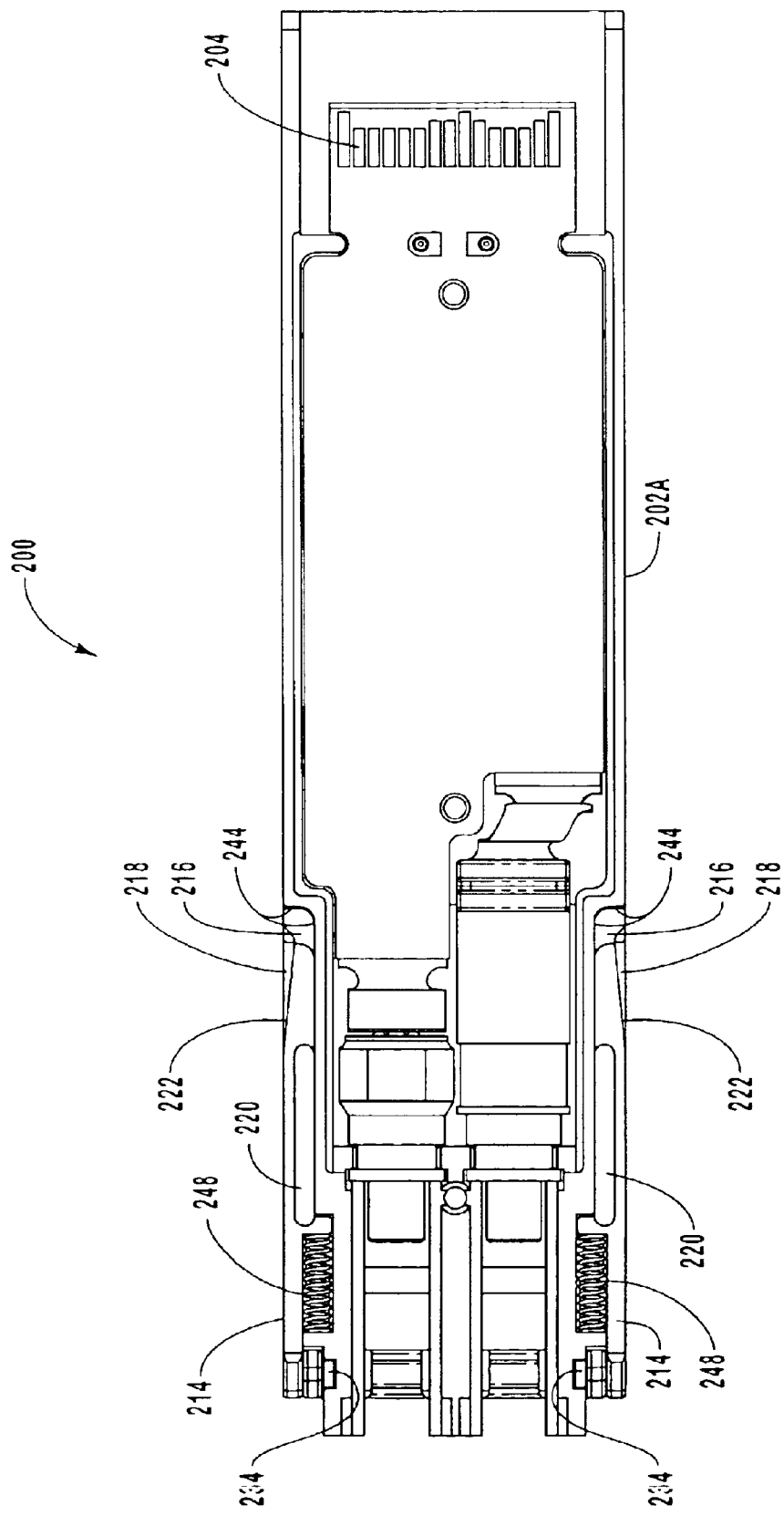
FIG. 7B is a bottom view of an exemplary module with the bottom cover removed and illustrates aspects of the arrangement and effect of resilient elements employed as part of an exemplary latch mechanism.

As indicated in FIG. 3B, the opposing side of the slider 214 includes structure arranged to interact with corresponding structure in the module housing 202, so as to collectively define a recess for housing a resilient element 248 (see, e.g., FIGS. 7A and 7B). Specifically, a step 224 is defined in the opposing side of the slider 214 that cooperates with a corresponding element in the module housing 202 to create a pair of parallel surfaces to which the resilient element 248 applies a force that opposes motion of the slider. Also, a tongue 226 is defined that cooperates with a corresponding element in the housing to create a recess that substantially restricts the movement of the resilient element 248 to the longitudinal direction. Finally, each slider 214 defines an opening 228 configured and arranged to receive a portion of the bail 212, as discussed below. As suggested earlier herein, the bail 212 generally causes motion of the sliders 214 such that the module 200 can be latched to, and unlatched from, the port 300.

Turning now to FIGS. 4A and 4B, details are provided concerning an exemplary implementation of the bail 212 such as may be employed in connection with the operation of the sliders 214. As indicated in those Figures, the bail 212 includes a handle 230 that connects opposing arms 232. Each of the arms 232 includes an inner pin 234 and outer pin 236, where the inner pins 234 are generally configured and arranged to interact with corresponding structure of the module housing 202, while the outer pins 236 are configured and arranged to be operably received within the corresponding openings 228 defined by the pair of sliders 214 (see FIG. 3B). As discussed in further detail below, the offset arrangement of each inner pin 234 with respect to the adjacent outer pin 236 enables rotational motion of the bail 212 to be converted into substantially linear motion of the sliders 214.

In the illustrated embodiment of bail 212, the handle 230 and arms 232 are formed as a single part. This arrangement has the benefit of reduced assembly cost and increased mechanical robustness. Additionally, the cross-sectional shape of the handle 230 is easy for the user to grip, permitting extraction of the module from the port 300. The flat top surface of the handle 230 also provides for the possible application of graphic elements. Of course, an integral, or one-piece, bail is only one possible design. Bails consisting of multiple parts, such as a bail with arms discrete from, and joined to, the handle, may alternatively be employed.

With attention now to FIG. 5, which illustrates aspects of the underside of the module with the bottom cover 202B removed, details are provided concerning various aspects of the module 200 structure, specifically, the sidewalls 202A, as such relate to the structure and operation of bail 212 and sliders 214. In particular, the sidewall 202A defines a recess 238 generally configured and arranged to slidingly receive a substantial portion of the slider 214. Proximate the recess 238, a lower guide slot 240A (see FIG. 6C) is defined in the bottom cover 202B that is configured and arranged to slidingly receive the lower guide portion 220 of the slider 214. A corresponding upper guide slot 240B is implemented by the module housing 202 that is configured and arranged to slidingly receive the upper guide portion 220 of the slider 214. Further, each sidewall 202A defines a wall 242 disposed at one end of the recess 238 and defining a further recess 244 in communication with the recess 238. Among other things, the wall 242 creates a barrier that prevents the latched module from being inadvertently extracted from the port 300, while the recess 244 is configured and arranged to slidingly receive the ramp 216, as necessitated by changes to the positioning of the slider 214 implemented by way of the bail 212.

Additionally, a recess 246 is defined that is configured and arranged to receive the step 224 of the slider 214. The recess 246 also receives a resilient element 248 (see FIGS. 7A and 7B). Finally, a substantially vertical slot 250 is defined that is configured and arranged to receive inner pin 234 of bail 212. Generally, the inner pin 234 rotates, and slides vertically, within the vertical slot 250 in correspondence with the motion of bail 212 between various positions. As a result of this arrangement, the position of the slider 214 is entirely defined by, and limited by, the relative position of the bail 212.

Figure 6:
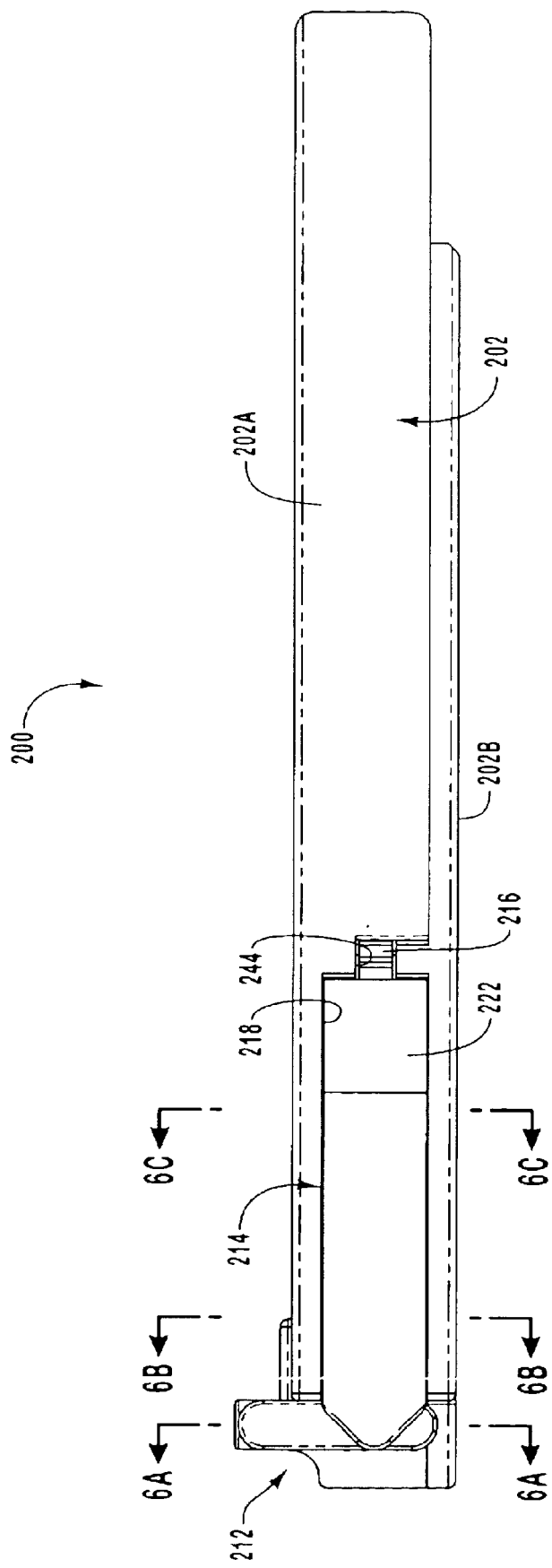
FIG. 6 is a side view illustrating aspects of an exemplary module and associated latch mechanism.
Figure 6A:
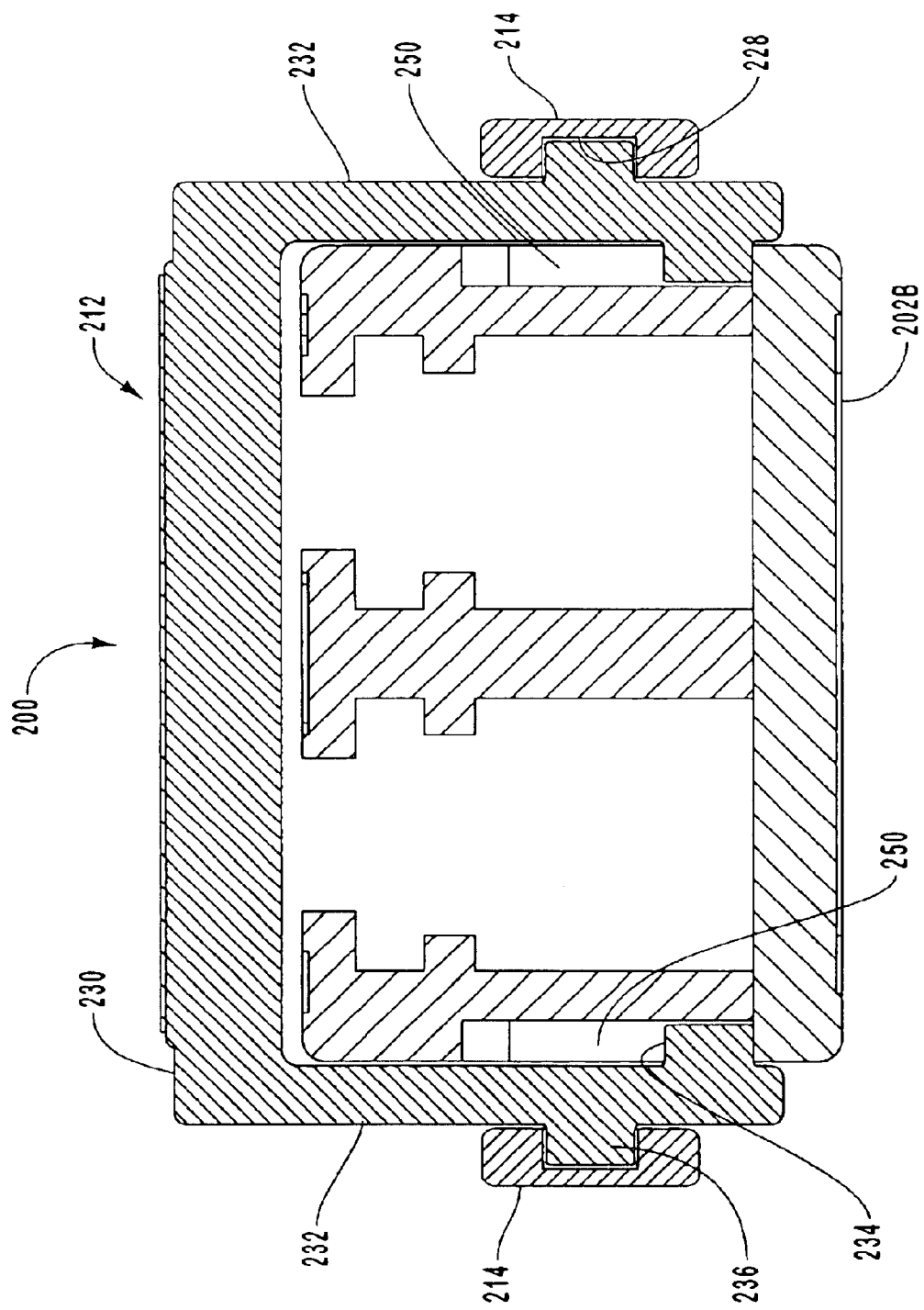
FIG. 6A is a cross-section taken from FIG. 6 and illustrates aspects of the arrangement of the bail with respect to the slider.
Figure 6B:
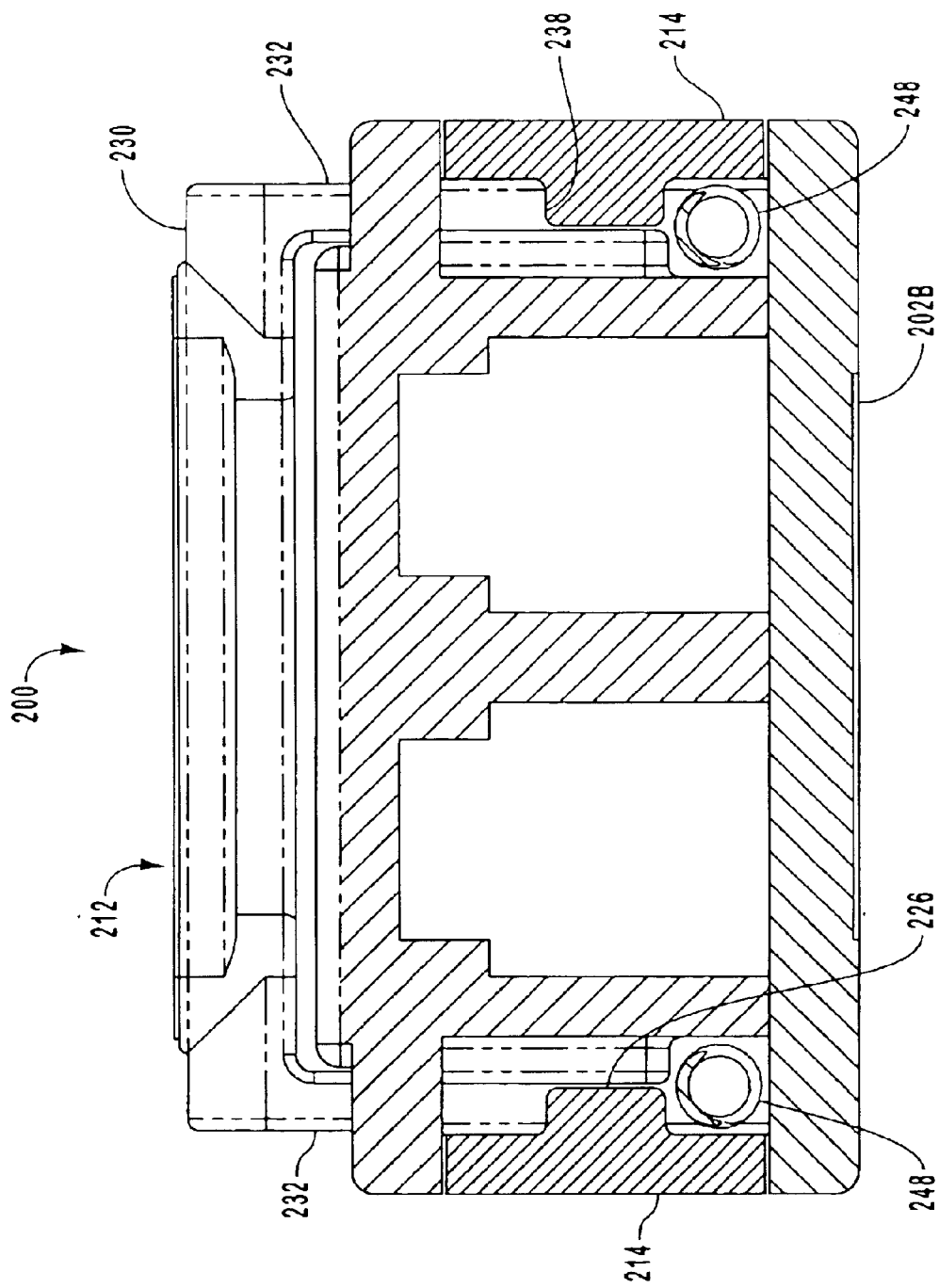
FIG. 6B is a cross-section taken from FIG. 6 and illustrates aspects of the arrangement of the sliders with respect to recesses defined in the sidewalls of the module.
Figure 6C:
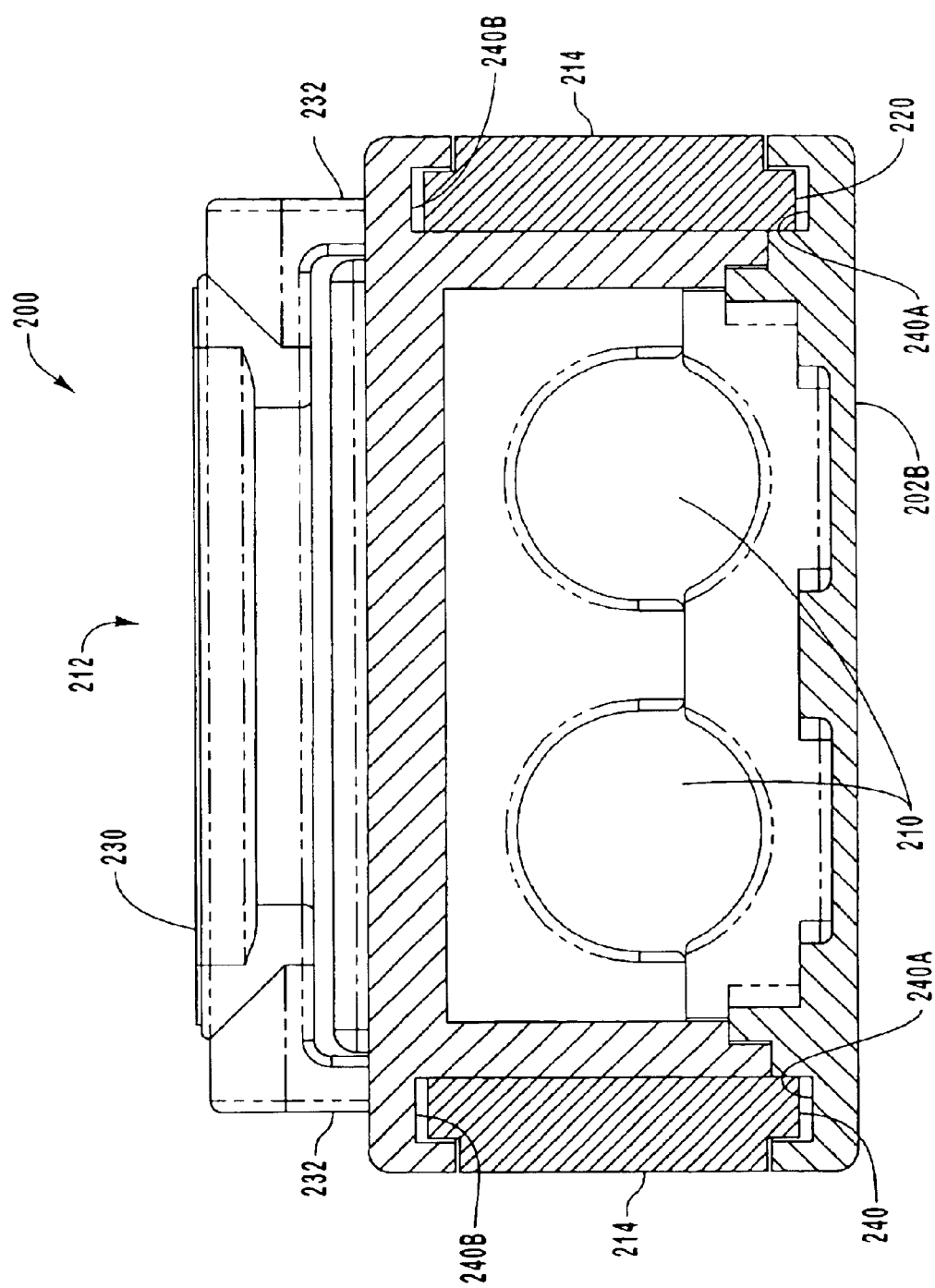
FIG. 6C is a cross-section taken from FIG. 6 and illustrates aspects of the arrangement of guide portions of the sliders with respect to guide slots defined in the sidewalls of the module.

Directing attention to FIGS. 6 through 6C, further details are provided concerning the disposition of the bail 212 and slider 214 with respect to the sidewall 202A of the module 200. Generally, FIG. 6 depicts the module 200 as the module 200 would appear with the bail 212 in a substantially vertical position and the module 200 latched into the port 300 (not shown), while sections 6A through 6C indicate various specific aspects of the arrangement of the slider 214 when the module 200 is so disposed. With particular reference first to FIG. 6A, the bail 212 is arranged so that the inner pins 234 are each received in corresponding slots 250 so that the inner pins 234 are able to rotate, and vertically slide, within the slots 250. The outer pins 236, positioned above the inner pins 234 when the bail 212 is oriented as shown are, as noted earlier, rotatably received within the openings 228 defined by the opposing arms 232 of the bail 212.

Of course, other arrangements are possible. For example, in one alternative embodiment, the nature of the connection between the bail 212 and the slider 214 may be reversed such that the bail 212 defines the openings 228, while the slider 214 includes the outer pins 236 received within the openings 228.

While further details are provided elsewhere herein concerning operational aspects of embodiments of the invention, a downward rotational motion of the bail 212, for example, generally causes the inner pins 234 to rotate in slots 250, as well as move upward in slots 250. At the same time, the rotation of the bail 212 causes outer pins 236 to translate the sliders 214 in a direction away from the host device (not shown).

With reference now to FIG. 6B, additional details are provided concerning aspects of the arrangement of the bail 212 and slider 214 with respect to the sidewall 202A of the module 200. In particular, the step 224 and tongue 226 of the slider 214 are disposed within the recess 238 defined in the sidewall 202A. As indicated earlier herein, the tongue 226 of each slider 214 facilitates, among other things, the confinement of a corresponding resilient element 248.

As shown in FIG. 6C, the upper and lower guide portions 220 of the slider 214 are slidingly received within the upper guide slot 240B and lower guide slot 240A of the sidewall 202A. Among other things, this arrangement permits sliding linear motion of the slider 214 in response to motion of the bail 212.

It was noted earlier herein that the resilient elements 248 facilitate various functionalities concerning the operation of the bail 212 and corresponding motion of the slider 214. With attention now to FIGS. 7A and 7B, such functionalities will be considered in further detail. In particular, the resilient elements 248 are configured and arranged to act upon the slider 214 in such a way as to bias the slider 214 toward the latched position, as indicated in FIG. 7B. Correspondingly, the resilient elements 248 tend to resist motion of the bail 212 into a position, such as that illustrated in FIG. 7A, where the module 200 is unlatched from the port 300.

In this way, the resilient elements 248 contribute to the secure retention of the module 200 within the port 300. Because the position of the sliders 214 and, thus, the position of the module 200 relative to the port 300, is primarily a function of the relative position of the bail 212, the resilient elements 248 serve to improve the user feel of the module 200 by masking deficiencies that may exist in the fit of the latch components and preferentially biasing the bail 212 into the latched and unlatched positions. Thus, one aspect of this exemplary implementation is that the motion of the bail 212 positively moves the sliders 214 between the latched and unlatched positions allowing the resilient elements 248 to be selected for feel rather than to provide a specific mechanical action. Generally, aspects such as, but not limited to, spring force, spring constant, spring bias, mechanical clearances, and configuration and positioning of the tongues 226 may be selected as necessary to suit the requirements of a particular application.

With respect to the exemplary implementations illustrated in the Figures, it should be noted that such implementations are not intended to limit the scope of the invention in any way. More generally, any other structure(s) and/or arrangements thereof that serve to implement comparable functionality may alternatively be employed.

II. Exemplary Operational Aspects of an Implementation of the Invention

Directing attention now to FIGS. 8A through 8D, and with continuing attention to FIGS. 1 through 7B, details are provided concerning various operational aspects of an exemplary implementation of the invention. As noted earlier herein, exemplary embodiments of the module 200 are configured so that the resilient elements 248 (not shown) act to bias the bail 212 into the position indicated in FIG. 8A, that is, a position where the module 200 is releasably locked into, or latched to, the port 300 by the presence of the resilient tab 304 (see, e.g., FIG. 2D) in the recess 218 collectively defined by the sidewall 202A of the module 200 and the slider 214. More particularly, when the module 200 is positioned in the port 300 in this way, the resilient tab 304 is biased into the recess 218 and bears on the wall 242 so as to prevent retraction of the module 200 from the port 300 (see, e.g., FIG. 2D).

Figure 8A:
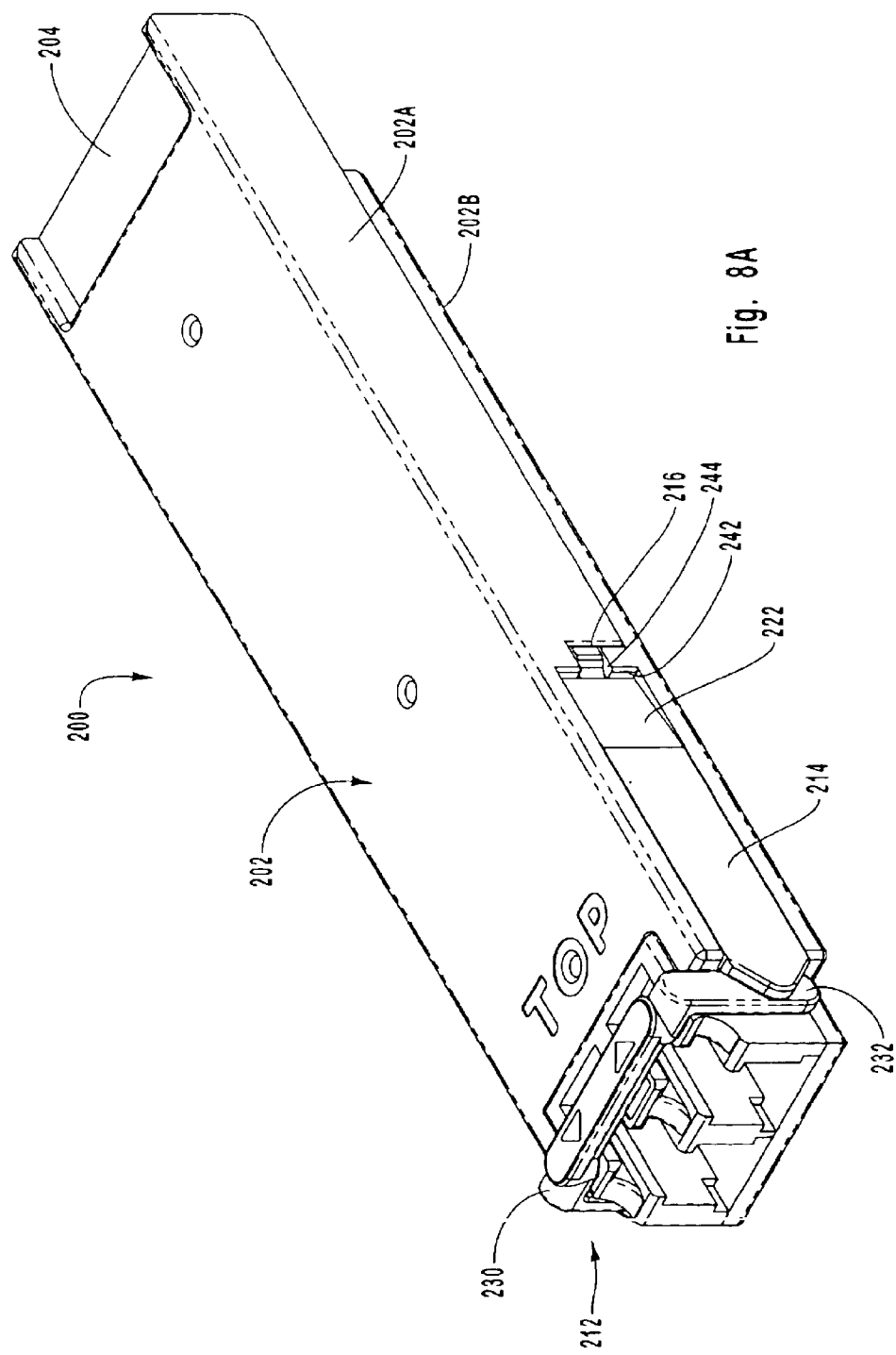
FIG. 8A is a perspective view of an exemplary module where the bail of the latch mechanism is in an upright position that corresponds to an arrangement where the module is latched to the port.
Figure 8B:
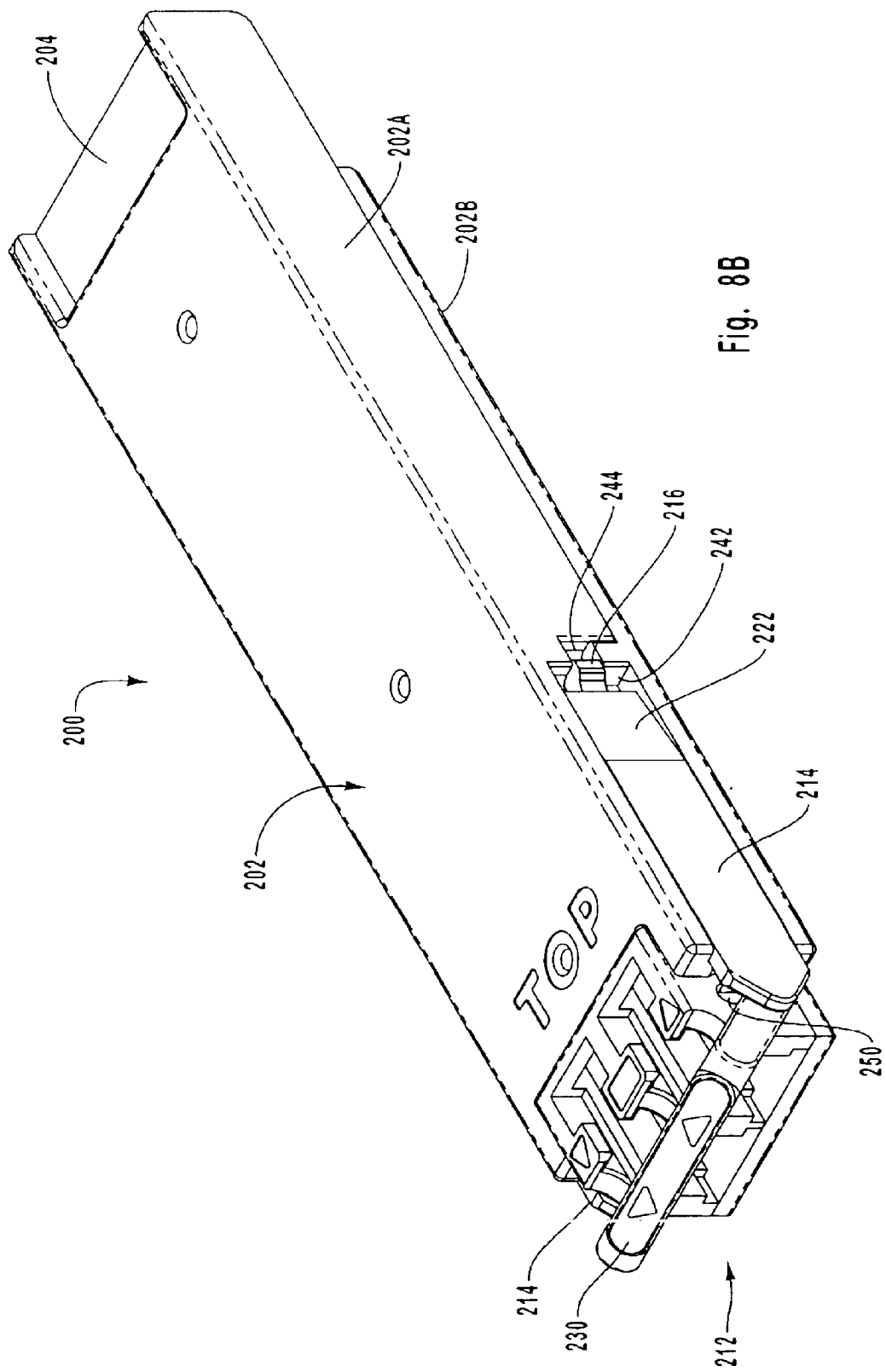
FIG. 8B is a perspective view of an exemplary module where the bail of the latch mechanism is in an intermediate position that corresponds to a partial unlatching of the module from the port.
Figure 8C:
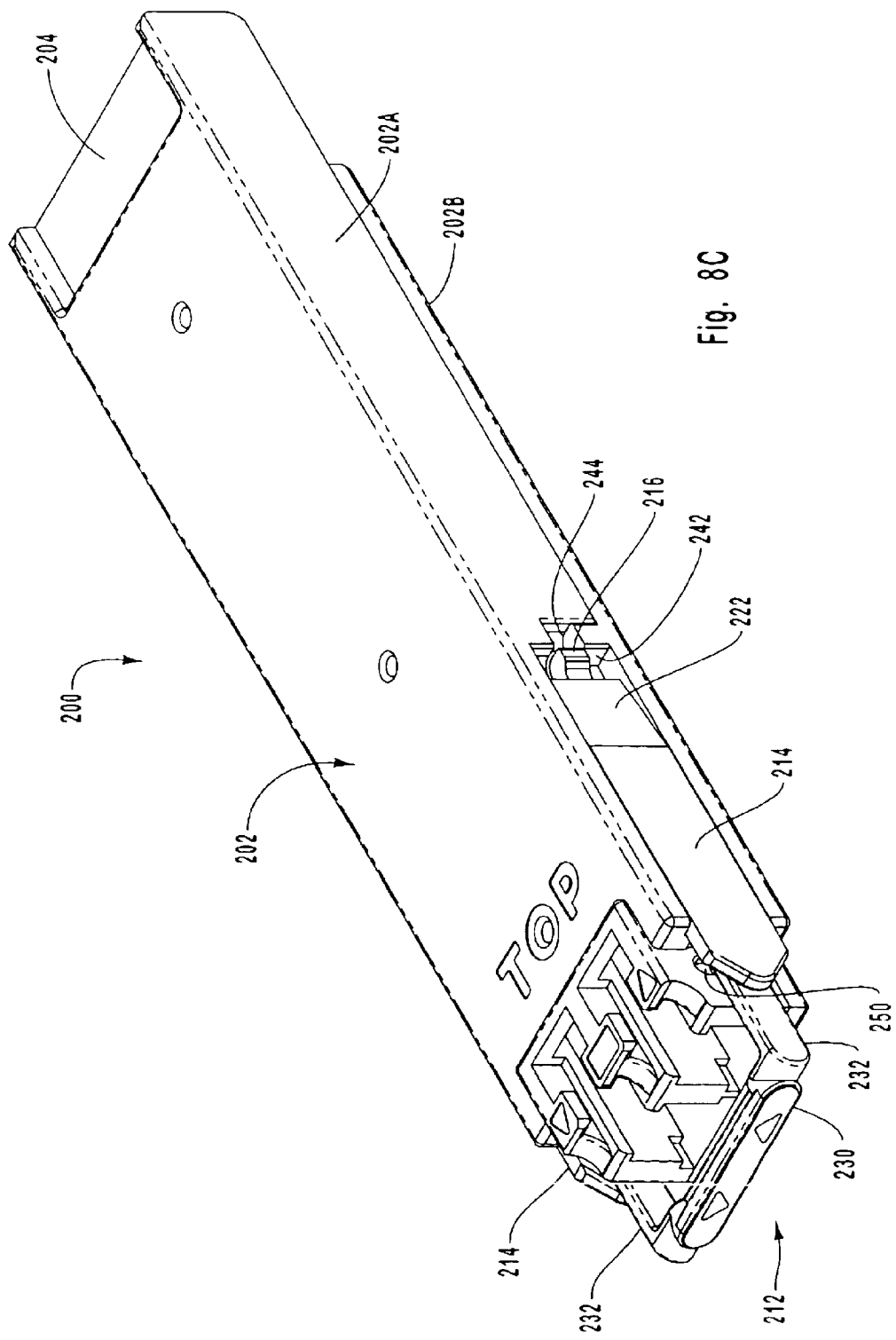
FIG. 8C is a perspective view of an exemplary module where the bail of the latch mechanism is in a substantially horizontal position that corresponds to an arrangement where the module is unlatched from the port and the bail is positioned for use as a handle for extracting the module from the port.
Figure 8D:
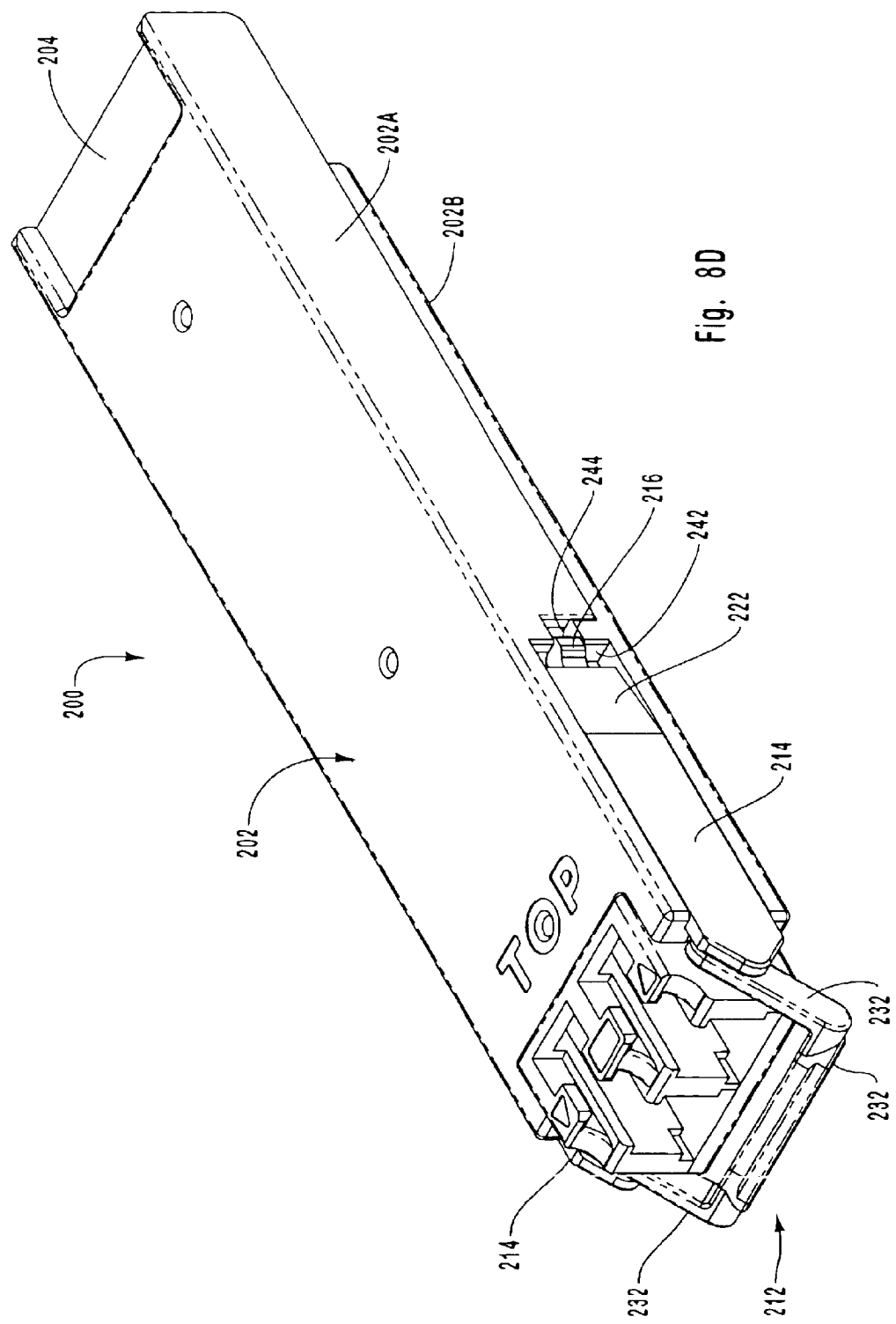
FIG. 8D is a perspective view of an exemplary module where the bail of the latch mechanism is in a resting position that corresponds to an arrangement where the module is unlatched from the port.

When it is desired to retract the module 200 from the port 300, the bail 212 is rotated from the vertical position indicated in FIG. 8A, through the position indicated in FIG. 8B, and into the position indicated in FIG. 8C. As generally discussed above, such rotary motion of the bail 212 corresponds to a retraction of the slider 214 in a direction away from the port 300. More particularly, rotation of the bail 212 in the direction collectively indicated by FIGS. 8A through 8C causes the inner pins 234 (see, e.g., FIG. 6A) to rotate and move upwardly in slots 250, thereby enabling retraction of the slider 214.

Thus, the offset arrangement of the inner pins 234 with respect to the outer pins 236 is such that rotation of bail 212 changes the horizontal distance between the inner pins 234 and outer pins 236. The interaction of the outer pins 236 with the openings 228 of the sliders 214 enables motion of the bail 212 to occur in such a way that the slider 214 experiences only linear motion. Further, the lower guide slot 240A and upper guide slot 240B, wherein the upper and lower guide portions 220 of the slider 214 are slidingly received, also serve to facilitate achievement of this result.

As the sliders 214 are retracted as described above, the respective ramps 216 are retracted as well. As the ramps 216 are retracted, each ramp 216 moves out of the corresponding recess 244 and engages the leading edge of the corresponding resilient tab 304 of the port 300. As this motion of the ramp 216 continues, the leading edge of the resilient tab 304 slides upward along the curved surface of the ramp 216 until the ramp 216 is disposed behind, and in contact with, the resilient tab 304 (see, e.g., FIG. 2B).

Continued retraction of the ramp 216, under the influence of the bail 212, causes the ramp 216 to push outwardly on the resilient tab 304, thereby countering the bias of the resilient tab 304, until the resilient tab 304 is moved out of the recess 218 collectively defined by the slider 214 and sidewall 202A (see, e.g., FIG. 2B). Movement of the resilient tabs 304 out of the corresponding recesses 218 in this way thus unlatches the module 200 from the port 300 and thereby enables ready retraction of the module 200 from the port 300.

With the bail positioned as shown in FIG. 8C the module 200 may be exacted from the port 300 by pulling on the handle 230. Once the module 200 has been removed from the port 300, the resilient elements 248 act to bias the bail 212 into the latched position indicated in FIG. 8A or, alternatively, the unlatched rest position indicated in FIG. 8D. Reinsertion, and securement, of the module 200 in the port 300 can then be readily accomplished. In particular, with the bail in the latched position, the module 200 is inserted into the port 300 until the resilient tabs 304 are seated in the corresponding recesses 208 of the module 200.

Thus, embodiments of the invention implement an effective, reliable and secure latch mechanism that is sufficiently compact to be implemented in connection with modules conforming to the XFP standard, while also permitting enhanced port density. Embodiments of the invention may be implemented in connection with modules conforming to various other standards as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic module suitable for use in connection with a host device that includes a port, the electronic module being configured to interface with corresponding structure of the port so as to be removably positioned within the port, and the electronic module comprising:
   a printed circuit board having circuitry configured to interface with the host device when the module is operatively received within the port;
   an end connector in communication with at least some of the circuitry and being configured to interface with the port;
   a housing including a pair of opposing sidewalls that cooperate to at least partially enclose the printed circuit board; and
   a latch mechanism attached at least indirectly to the sidewalls of the housing and comprising:
      a pair of opposing sliders, each of which is at least partially received in a respective opposing sidewall of the housing, and the sliders being collectively configured and arranged to facilitate selective engagement of the module with the corresponding structure of the port; and
      a bail attached to the sliders and to the opposing sidewalls, and the bail being configured and arranged such that motion of the bail results in a corresponding motion of the sliders.

2. The electronic module as recited in claim 1, wherein a rotational motion of the bail corresponds to substantially linear motion of the sliders. rotational motion relative to the sidewalls.

3. The electronic module as recited in claim 1, further comprising at least one resilient element configured and arranged to bias the bail into a desired position.

4. The electronic module as recited in claim 1, further comprising a 'receive' optical subassembly and 'transmit' optical subassembly, both of which are in communication with the circuitry.

5. The electronic module as recited in claim 1, wherein the module substantially conforms to the XFP standard.

6. The electronic module in claim 1, wherein the bail is moveable between a first position wherein the electronic module is removably latched to the port, and a second position wherein the electronic module is unlatched from the port.

7. The electronic module as received in claim 6, wherein the bail is rotably attached to the sliders, and wherein the bail is configured for both translational and rotational motion relative to the sidewalls.

8. A latch mechanism suitable for use in connection with an electronic module having a housing configured to be selectively received within a port of a host device, the latch mechanism configured to interact with corresponding structure of the port and comprising:
   a pair of opposing sliders, each of which is at least partially received in the housing of the module, and the sliders being collectively configured and arranged to facilitate selective engagement of the module with the corresponding structure of the port; and
   a bail attached to the sliders and to the housing of the module, the bail being configured and arranged such that motion of the bail results in a corresponding motion of the sliders, and the bail being movable between a first position wherein the electronic module is removably latched to the port, and a second position wherein the electronic module is unlatched from the port.

9. The latch mechanism as recited in claim 8, wherein the sliders are configured and arranged to move in unison under the influence of the bail.

10. The latch mechanism as recited in claim 8, wherein a rotational motion of the bail corresponds to substantially linear motion of the sliders.

11. The latch mechanism as recited in claim 8, wherein the bail comprises a set of inner pins and a set of outer pins, the set of inner pins being configured to be rotatably connected to the housing of the module, and the set of outer pins being rotatably connected to the sliders.

12. The latch mechanism as recited in claim 8, further comprising at least one resilient element configured and arranged to bias the bail into a desired position.

13. An opto-electronic module suitable for use in connection with a host device that includes a port, the opto-electronic module being configured to interface with corresponding structure of the port so as to be removably positioned within the port, and the opto-electronic module comprising:
   a 'receive' optical subassembly;
   a 'transmit' optical subassembly;
   a printed circuit board having circuitry in communication with the 'receive' and 'transmit' optical subassemblies, and being configured to interface with the host device when the opto-electronic module is operatively received within the port;
   an end connector in communication with at least some of the circuitry and being configured to interface with the port;
   a housing including a pair of opposing sidewalls that cooperate to at least partially enclose the printed circuit board and the 'receive' and 'transmit' optical subassemblies; and
   a latch mechanism attached at least indirectly to the sidewalls of the housing and comprising:
      a pair of opposing sliders, each of which is at least partially received in a respective opposing sidewall of the housing, and the sliders being collectively configured and arranged to facilitate selective engagement of the module with the corresponding structure of the port; and
      a bail rotatably attached to the sliders and also rotatably attached to the opposing sidewalls, and the bail being configured and arranged such that rotation of the bail results in linear motion of the sliders.

14. The opto-electronic module as recited in claim 13, wherein the bail is movable between a first position wherein the electronic module is removably latched to the port, and a second position wherein the electronic module is unlatched from the port.

15. The opto-electronic module as recited in claim 13, wherein the opto-electronic module substantially conforms to the XFP standard.

16. The opto-electronic module as recited in claim 13, further comprising at least one resilient element configured and arranged to bias the bail into a desired position.

17. The opto-electronic module as recited in claim 16, wherein the at least one resilient element is configured andarranged to bias the bail into a first position wherein the electronic module is removably latched to the port.

18. A latch mechanism suitable for use in connection with an electronic module conforming to the XFP standard, the electronic module having a housing that includes opposing sidewalls and is configured to be selectively received within a port of a host device, the latch mechanism configured to interact with corresponding structure of the port and comprising:

- a pair of opposing sliders, each of which is received in a corresponding sidewall of the module and each of which is configured and arranged for translational motion relative to the sidewall, and the sliders being collectively configured and arranged to facilitate selective engagement of the module with the corresponding structure of the port;
- a bail attached to the sliders and to the housing of the module, the bail being configured and arranged such that motion of the bail results in a corresponding motion of the sliders, and the bail being movable between a first position wherein the electronic module is removably latched to the port, and a second position wherein the electronic module is unlatched from the port; and
- a pair of resilient elements, each of the resilient elements being retained in a respective recess cooperatively defined by a slider and the housing of the module, the pair of resilient elements being collectively configured and arranged to bias the bail into a desired position.

19. The latch mechanism as recited in claim 18, wherein the bail is movable between a first position wherein the sliders are engaged with the corresponding structure of the port, and a second position wherein the sliders are disengaged from the corresponding structure of the port.

20. The latch mechanism as recited in claim 18, wherein the bail is rotatably attached to the pair of sliders and to the module housing.

21. The latch mechanism as recited in claim 18, wherein a rotational motion of the bail corresponds to substantially linear motion of the sliders.

22. The latch mechanism as recited in claim 18, wherein the pair of resilient elements bias the bail into a position where the sliders have engaged the corresponding structure of the port.

* * * * *